United States Patent [19]

Shepperd et al.

[11] Patent Number: 4,627,073
[45] Date of Patent: Dec. 2, 1986

[54] BINARY DATA TRANSMISSION METHOD

[75] Inventors: Michael B. Shepperd, Livermore; Allan L. Blevins, San Jose, both of Calif.

[73] Assignee: Myriad Concepts, Inc., Milpitas, Calif.

[21] Appl. No.: 655,720

[22] Filed: Sep. 28, 1984

[51] Int. Cl.$^4$ .................................... H04L 7/02
[52] U.S. Cl. ...................... 375/20; 375/36; 375/55; 375/95; 375/110
[58] Field of Search ............ 360/42, 44; 375/17, 375/20, 36, 55, 87, 95, 110, 113; 179/2 DP, 3

[56] References Cited

U.S. PATENT DOCUMENTS

| | | | |
|---|---|---|---|
| 2,546,316 | 3/1951 | Peterson | 370/101 |
| 3,335,369 | 8/1967 | Priebe | 375/110 |
| 3,389,223 | 6/1968 | Neiswinter et al. | 375/36 |
| 3,680,050 | 7/1972 | Griffin | 375/55 |
| 3,789,303 | 1/1974 | Hoffman et al. | 375/55 |
| 4,429,406 | 1/1984 | Hale | 375/113 |
| 4,521,766 | 6/1985 | Vry | 375/17 |

Primary Examiner—Benedict V. Safourek
Attorney, Agent, or Firm—Ciotti & Murashige

[57] ABSTRACT

A process for transmitting a stream of digital data over a high impedance metallic pair transmission line under high loss conditions is disclosed. This process involves first converting the digital data into a stream of binary code. The first element of the code has a bit cell voltage-time wave shape that begins at 0 volts, moves sharply to an initial voltage A different than zero, at mid cell traverses 0 volts to a second voltage B of similar magnitude but opposite sign to the initial voltage A and that returns to zero at the end of the bit cell. The wave shape has a duty cycle of 80% or greater. The second element of said code is a mirror image of the first element. This code is applied to one end of the transmission line. the stream of binary code is then detected at the other end of the transmission line and reformatted to digital data.

11 Claims, 6 Drawing Figures

BINARY DATA TRANSMISSION METHOD

FIELD OF THE INVENTION

This invention relates to the transmission of binary data over metallic pair transmission media. More particularly, it provides a method of coding and decoding that permits high speed transmission of binary data at high loss conditions over metallic transmission media such as telephone cable.

PRIOR ART

Transmission lines used in the outside plant telephone network have been designed to transmit signals in the frequency range of 100 Hz to 4 KHz. This was done to accommodate the primary focus of use, voice information. All forms of communication since the inception of a telephone network were based on this range of frequencies until the 1960's and the advent of computers. Since that time the need to communicate non-voice information from place-to-place has become a way of life. The telephone network is still the most widely available method to provide point-to-point communications.

The heart of this system is a web of copper wires between a subscriber and a telephone network switching device. The typical connection is a 2 or 4 wire continuous metallic conductor whose main electrical characteristic is its material capacitance. This value is primarily 0.082 ufd/mile though other values are used. The other major characteristic of concern is the D.C. resistance which is a factor of gauge and length. Gauges range from 26 to 19. These and other electrical characteristics combine to form a passive low pass filter which causes great attenuation and distortion of signals that have frequencies above 4 KHz.

There are other factors that effect transmission over the phone network and these can be referred to as impairments. A partial list follows:

1. Load coils: Inductors placed in series with the wire to help the quality of voice for long distances.
2. Splices
3. Gauge changes within a continuous metallic connection
4. Bridge tap: Unterminated extensions to a particular connection that result during physical installation to a subscriber
5. Environmental adversities.

These impairments generally have a greater effect on higher frequency transmissions.

There is a need for methods for transmitting binary data over metallic lines at high loss conditions as can occur at high data rates, with poor quality transmission lines, and with extended distances. As a general basis of comparison the commonly used T1 carriers can tolerate up to about 40 dB of loss—that is at 40 dB loss, acceptable signal integrity is still present. At levels above 40 dB, signal detection is not adequate. Such low loss limits are a problem in many real world settings. For example, they limit data transmission to about 50–75,000 KHz over a distance of 3-4 miles unless expensive coaxial cable or the like is employed. Or viewed alternatively, they prevent already in place twisted-pair metallic subscriber loops from being used to effect data communcation at high frequencies and/or over long distances. The present invention provides a method for carrying out such data transmission. The present method employs a return-to-zero code method with which data integrity is maintained even at losses of 70 to 75 dB. The transmitted wave form is a square wave having a mid-cell transition. Our U.S. patent application No. 563,892 filed on the 20th of December 1983 depicts in FIG. 5 a return-to-zero trapezoidal wave shape for data transmission. U.S. Pat. No. 3,863,025 of Gonsewski et al shows in FIG. 3 a binary return-to-zero code. Both of these prior codes are characterized by essentially 50% duty cycles, that is, the time away from 0 is about 50% of the total time. Other art includes Holmes et al, U.S. Pat. No. 3,859,631; Lamare et al U.S. Pat. No. 4,188,620 and Miller et al U.S. Pat. No. 4,437,086 which disclose the concept of determining a digital value by detecting the direction of a mid-cell transition. Wu's U.S. Pat. No. 3,961,367 records digital data by identifying the beginning of a cell and noting the presence or absence of a mid-cell transition. There is also U.S. Pat. No. 3,905,029 to McIntosh which uses early and mid-cell transitions to identify different binary values.

Other art which shows data coding schemes include for example, Lender U.S. Pat. No. 3,457,510—a modified duobinary data transmission scheme, Torpie, U.S. Pat. No. 3,919,476—a time dependent two to three level alternate encoding, and van Gerwen et al, U.S. Pat. No. 4,313,203 which at FIG. 2 shows a "crankshaft code" which is a form of bipolar return to zero encoding.

STATEMENT OF THE INVENTION

The present invention provides a method for encoding and decoding data which permits the data to be accurately received under high loss conditions such as result from the use of metallic pair transmission media and/or high data rates. More particularly, by the present method, digital data is transmitted by (a) converting the digital data into a stream of binary code. In this code, the first element has a bit cell voltage—time wave shape that begins at a starting voltage (most commonly 0) and moves sharply to a first voltage detectably different from the starting voltage. It remains at this first voltage until the mid-cell at which time it traverses the starting voltage to a second voltage similar in magnitude but opposite in sign to the first voltage. At the end of the bit cell the wave returns to the starting voltage subject to the limitations that the wave has a duty cycle (that is fraction of time away from the starting voltage) of about 80% or greater and that the areas on either side of the starting voltage are equal. The other element of the code is a mirror image of the first element;

(b) apply said stream of binary code to one end of a transmission line;

(c) with a detector detecting said stream of binary code at the other end of the transmission line; and (d) reformatting the detected stream of binary code to digital data.

The detection method can be self clocked (preferred at very high bit rates) or can employ an external clock. Detection can be carried out by various formats. For one, the first voltage can be detected and validated by detecting the mid-cell transition. For another, the voltage can be detected at a plurality of intervals during the first half of the bit cell and checked to determine if at least a predetermined fraction of said voltages are voltage related to the first voltage or to the second voltage.

This transmission method offers significant advantages in that even at very high loss levels, such as 70 to 75 dB or greater the data stream can be detected. More particularly, since the recognition of a valid code element merely requires the sequential detection of one or two voltage changes from a starting voltage, data can be more easily discriminated from random noise even under high loss conditions. This enables the data to be transmitted over poor media (such as twisted pair telephone cable) and at high rates (such as several hundred kilocycles). When the starting voltage is zero, each bit of data has no charge so that there is no polarization or charge build up on the line.

BRIEF DESCRIPTION OF THE DRAWINGS

FIG. 6 shows a pair of wave shapes. These represent the transmitted binary wave shapes used herein. FIG. 6a is a binary, or logic one. FIG. 6b is a binary, or logic 0.

DETAILED DESCRIPTION OF THE PREFERRED EMBODIMENT

Figure 1:
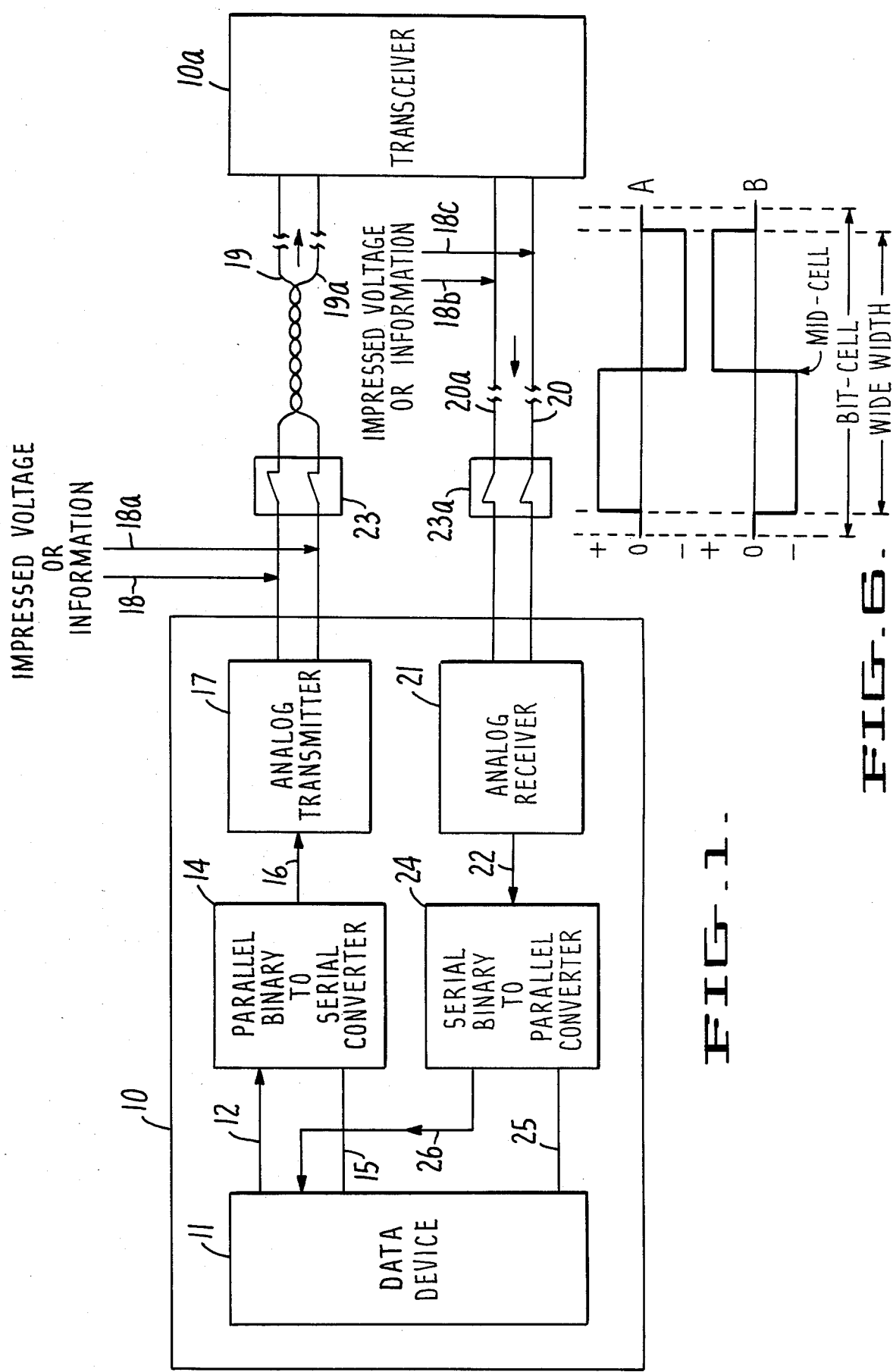
FIG. 1 is an overall block diagram of a system employing the invention to transmit binary data between two data devices such as analog to digital convertors.

Turning to FIG. 1, a block diagram of an overall system for transmitting data is shown. This system is made up of a transceiver 10 connected by two two wire metallic conductors 19/19a and 20/20a to a second essentially identical transceiver 10a (shown in block form). In FIG. 1, two conductor pairs, 19/19a and 20/20a are shown. It will be appreciated that a single pair of conductors work as well, when a suitable multiplexer is employed. Transceiver 10 includes data device 11 which is a device capable of producing or using digital data. Data device 11 can be a computer, a terminal, an analog to digital converter or the like. This device takes signals whether they be digital or analog or the like and converts them into a parallel stream of binary digital signals, conventionally 0 volts for one binary state and 5 volts for the other. This binary bit stream is passed via path 12 to parallel binary to serial converter 14. Converter 14 is shown in detail in FIG. 2 and controlled by asynchronous control signals supplied by external data device 11 via path 15. Data from device 11 clocks through converter 14 one binary bit at a time producing outputs at path 16 which control analog transmitter 17 to produce the high duty cycle bipolar return-to-zero wave shape of this invention corresponding to binary 0 or binary 1 as appropriate. (Transmitter 17 is shown in FIG. 3). This return-to-zero wave shape is transmitted upon metallic cable pair 19/19a to transceiver 10a which has an analog receiver section as shown in transceiver 10 as 21. This receiver detects the transmitted analog wave and determines whether the initial voltage is positive or negative and, confirms that the detected wave is a valid bit of binary data. This confirmation can be carried out by any data confirmation method, including for example, by detecting the mid-cell change in polarity, by detecting one or more points of identical polarity in the first half of the bit cell or the like. In the embodiment detailed hereafter confirmation is carried out by confirming identical polarity in the first half of the bit cell. It will be appreciated that under low loss conditions, the signal received will closely resemble the signal sent but that under high loss transmission conditions, such as long distances or high rates, the metallic conductor pairs will act primarily as an integrator converting to some extent the transmitted bipolar wave into a unipolar wave. This integration may be taken into account in arriving at the exact detection method to be employed. Analog receiver 21 produces a stream of serial binary bits corresponding to the stream of waves received and passes this serial bit stream via path 22 to converter 24 which decodes the serial bit stream and forms the bits into 8 bit parallel data packages which it transfers via path 26 to a data device such as device 11. Control signals pass between device 11 and converter 24 via conduit 25.

Figure 2:
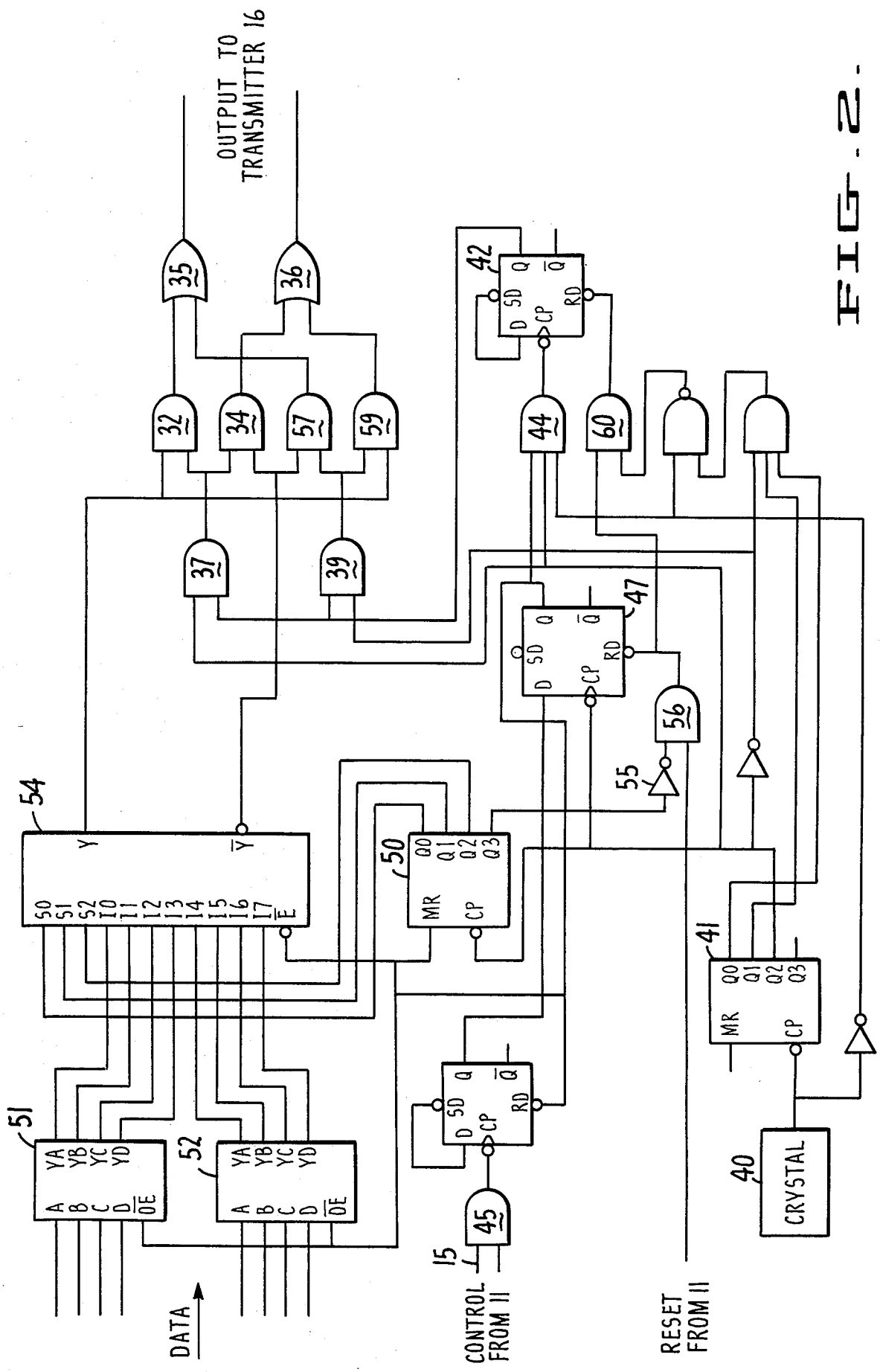
FIG. 2 is a detailed schematic of that part of the system of FIG. 1 that converts the binary data from the data device into a form to be used by the analog transmitter.
Figure 3:
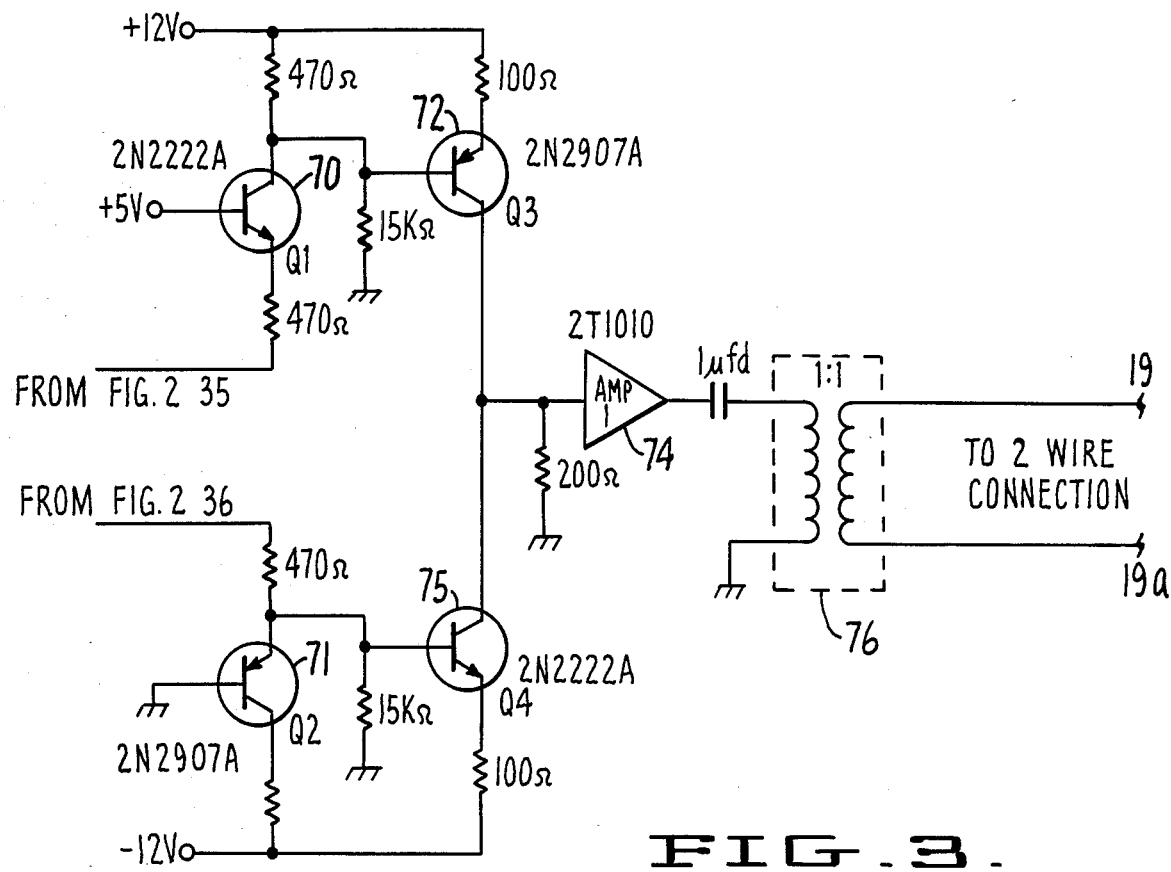
FIG. 3 is a detailed schematic of an analog transmitter that transmits data, prepared such as by the device of FIG. 2, over a metallic pair of wires.

Turning now to FIG. 2, an embodiment of circuitry for parallel binary to serial converter 14 is shown.

As explained in detail hereinafter, eight bit parallel data from data device 11 (not shown) is passed through multiplexer device 54 one bit at a time so that AND gates 32, 34, 57 and 59 will produce the appropriate logic 1 at the input to OR gates 35 and 36 whose outputs control the outputs of the transmitter drivers of transmitter 17 (not shown). Gates 37 and 39 provide enable signals that control the timing of the OR gate 35 and 36 outputs so that the transmitted wave shape will have a total duty cycle that is about 87.5% of one period of the clock frequency "Sysclk" obtained at 41 that is clocking device 54. Best results (i.e., best signal detections) are obtained when the duty cycle is at least about 80% with 87.5% being easily obtained using an eight count bit cell. Clock frequency "Sysclk" is the fundamental frequency at which the system transmits data. "Sysclk" is typically 200 Kc or greater. The Sysclk frequency is provided by crystal 40 and divider 41. Crystal 40 has a frequency 8x Sysclk, i.e., crystal 40 produces eight pulses during each bit cell of the input data. The factor of 8 times allows the necessary control of the transmitted wave shape. The Q2 output of counter 41 is $\frac{1}{8}$ the frequency of the crystal and is used as the system clock or sysclk. Bit rate is controlled by this signal. Thus, a bit cell contains 8 counts. AND Gates 37 and 39 are controlled by flip-flop 42 which acts as a one shot to control transmitted bit times. Flip-flop 42 enables 37 and 39 when an input clock pulse CP goes positive. This in turn occurs when bit cell start control gate 44 goes positive at $\frac{1}{8}$ count into the bit cell.

Data device 11 (not shown), which will be connected as shown in FIG. 1, will have asynchronous control of the transmitter via line 15 thru gate 45, and flip-flops 46 and 47. As described hereinafter, devices 45, 46 and 47 synchronize the asynchronous external event (arrival of data from device 11) with the internal clock signal of crystal 40 and divider 41. The "Q" output of flip-flop 47 is the enable line for reading in the 8 bit package of information that is to be transmitted. AND gate 56 provides the reset to flip-flop 47 so that transmission stops after 8 counts or via an external reset.

Counter 50 uses a clock frequency that has a 50% duty cycle to clock one bit at a time from the tri-start buffers 51 and 52 thru multiplexer device 54. Counter 50 doesn't start counting until the "Q" output of flip-flop 47 goes to a logic 1. The eighth clock pulse into counter 50 results in a reset thru invertor 55 and AND gate 56 to reset flip-flop 47.

After the Q output of flip-flop 47 goes to a logic 1 the "Q" output of 42, the one shot, goes to a logic one when the crystal output goes to a logic 0, which is the second half of the cycle that causes sysclk to go to a logic 1. This allows for settling at the output of all devices. (This generates the ½ count delay in getting an enable signal to 42 from 44).

The data bit at the "Y" and "Y not" outputs of converter 54 changes as the control lines from 50 change. 50 changes on the positive going transition of sysclk and since sysclk has a 50% duty cycle the data from 54 is steady after the initial change (the reason for the enable to one shot 42 to be delayed) until the next sysclk logic 0 to logic 1 transition.

Gates 32 and 34 are enabled via 37 which is enabled by the one shot and the logic 1 half of sysclk. When 37 is at a logic 1 then either 32 or 34 will be at a logic 1 depending on the value of the bit at multiplexer 54. A logic 1 will cause gate 32 to have a logic 1 at it's output, a logic 0 will cause a logic 1 at gate 34. The resultant output of 32 or 34 will cause either 35 or 36 to go to a logic 1 which in turn drives transmitter 17 of FIG. 3 to produce the first half of the wave form of FIG. 6. If 35 output is at a logic 1 than the first half of the wave form of part A of FIG. 6 will be produced. When sysclk goes from a logic 1 to a logic 0 at the 50% point of it's complete cycle, 37 goes to a logic 0 and 39 goes to a logic 1. This enables either 57 or 59. If the data bit from multiplexer 54 is a logic 1, it in turn will drive transmitter 17 of FIG. 3 to produce the second half of the wave shape of part A of FIG. 6. If the data bit at 54 is a logic 0 then the wave shape of part B of FIG. 6 is produced by 37 going to a logic 1 thereby allowing 34's output to go to a logic 1 thereby driving 36 to a logic 1 which will drive the transmitter of FIG. 3 to produce the first half of part B of FIG. 6. At the 50% point of sysclk 39 will go to a logic 1 which will enable 37's output to go to a logic 1 which will drive 35's output to a logic 1 which will drive the transmitter to produce the second half of part B of FIG. 6.

The one shot 42, is reset to a logic 0 by 60 which is controlled by an external reset or the result of 41 counting to 7 plus the inverse of the crystal output. The one shot is set to a logic 1 as explained above on each sysclk until 50 counts to 8 at which time 47 is reset which stops 44 from setting 42.

Turning now to FIG. 3, a schematic of analog transmitter 17 is shown. The output of devices 35 and 36 of converter 14 as discussed in FIG. 2 are connected to transitors 70 and 71 respectively. Transistors 70 and 72 will drive the input to AMP 74 with a positive voltage. Transistors 71 and 75 will drive the input to AMP 74 with a negative voltage. The design of converter 14 shown in FIG. 2 assures that the input to AMP 74 will always be of the wave shapes shown in FIGS. 6a and 6b.

AMP 74 is used for buffering the output of the transistors and providing the ability to drive into the high mutual capacitance of a metallic two wire telephone loop 19/19a. A transformer 76 is shown because it is required by FCC regulations but is not a requirement for the operation of this transmitter.

Figure 4:
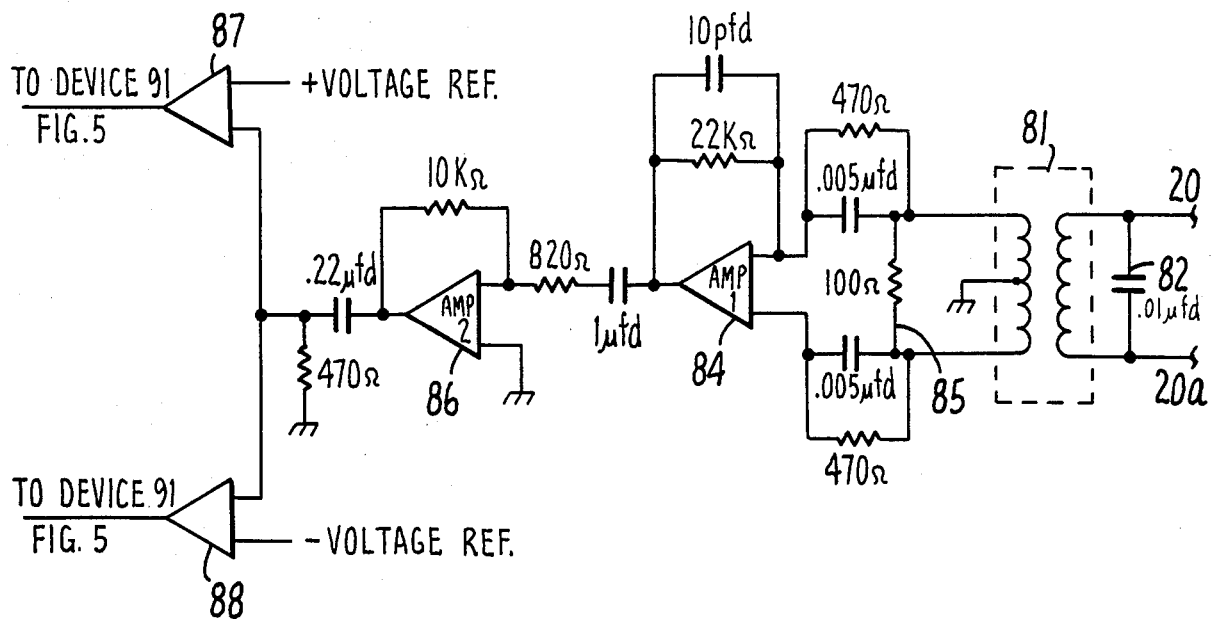
FIG. 4 is a detailed schematic of a receiver that takes information from a metallic pair of wires and presents it as binary digital data.

Turning now to FIG. 4 in schematic of analog receiver 21 as shown. For brevity, we will refer to receiver 21 as well as converter 24 contained within transceiver 10. As will be appreciated, the actual receiver and converter which will receive the signal transmitted on lines 19/19a will be located within transceiver 10a. The input to receiver 21 is a two wire connection 20/20a terminated at a transformer 81. The capacitor 82 across the inputs is to help reduce common mode noise, and can have a value of 0.01 ufd, for example. The secondary of the transformer 81 is configured so that AMP 84 is driven differentially. The transformer 81 is center tapped and terminated with a resistor 85, for example 100 ohms.

The inputs to AMP 84 are tuned circuits optimized for a 300 KHz bit rate. The gain of this stage is approximately 20. The gain of this stage should be kept under 50. Experimentation has shown that if the input signal has an amplitude of approximately 100 millivolts peak to peak and the gain is greater than 50, the output of this stage will be distorted by the physical limitations of the amplifier.

If the input to AMP 84 is going to be greater than 100 millivolts than a limiter circuit should be added between AMP 84 and the secondary of the transformer.

The second stage of amplification AMP 86 can be varied to meet design needs but this implementation requires a gain of 100. The result of this large gain is to cause the integration of the signal from the first stage. This filters out the pertibations caused by the telephone loop which is not an ideal transmission media.

The output of AMP 86 is capacitively coupled to two comparators 87 and 88 that have a positive and negative reference to detect the presence of either polarity. The output of AMP 86 will produce only a positive voltage for the transmitted wave shape of part a of FIG. 6 and will produce only a negative voltage for the transmitted wave shape of part B of FIG. 6.

Figure 5:
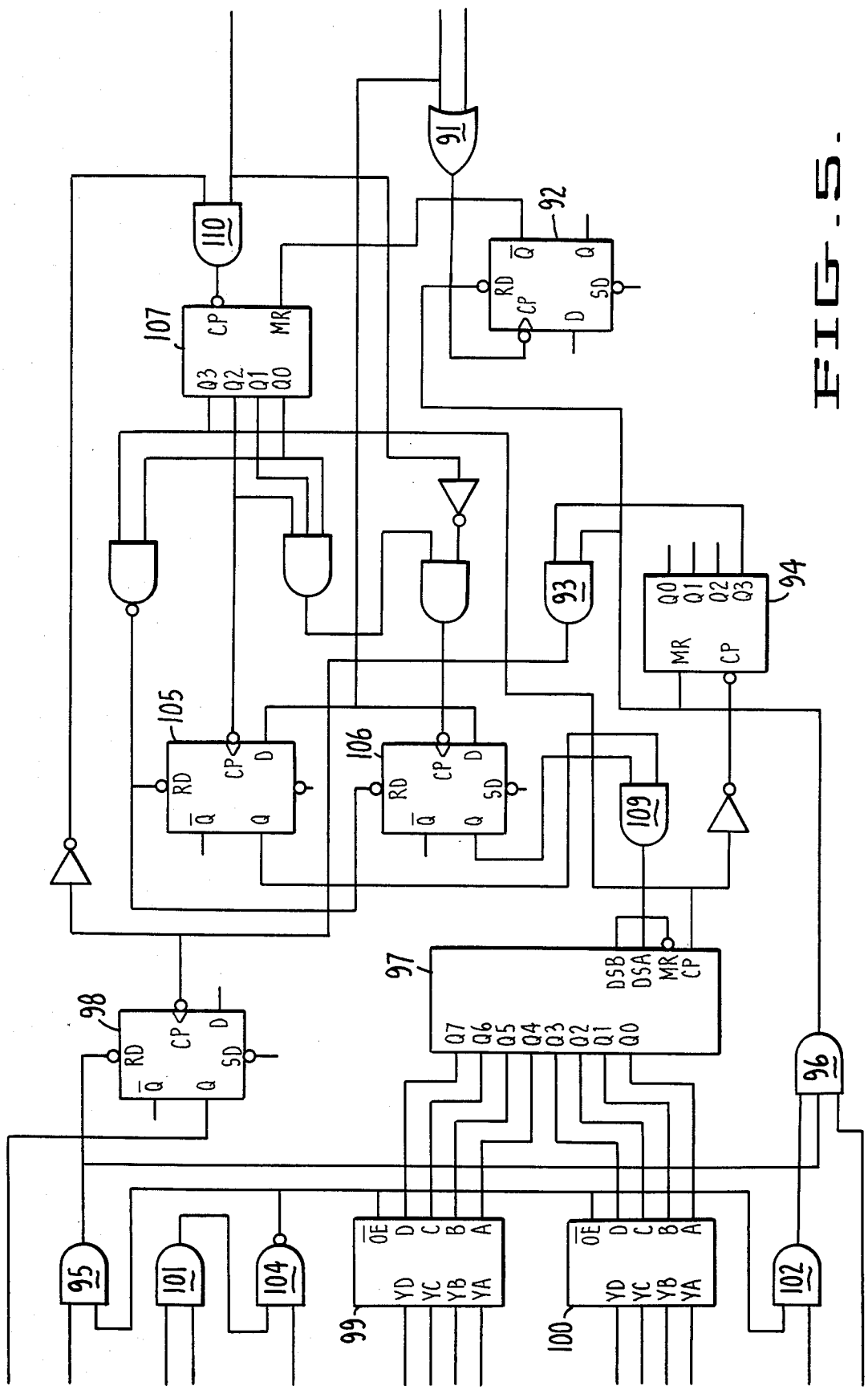
FIG. 5 is a detailed schematic of that part of the device that prepares the data received by a device as shown in FIG. 4 to be used by a data device as described in FIG. 1.

The outputs of the comparators are either 0 volts or 5 volts which makes them compatible with the inputs to FIG. 5's device 91. The output's of the comparators stay at the plus 5 volt level as long as the input from AMP 86 is greater than the positive or negative reference voltages.

FIG. 5 depicts a schematic of converter 24 in which receiver 21's output is a serial bit stream of logic 1's and 0's that are received at OR-gate 91 which clocks the output of flip-flop 92 which enables converter 24 to decode an 8 bit package. Counter 94 will count 8 clock pulses at input CP and then the "Q3" output will invert to stop the decoding of input bits until reset by an external acknowledgement from the receiving data device (actually located in transceiver 10a but shown in FIG. 1 as data device 11) via AND-gates 95 and 96. Decoding will begin again when the output of receiver 21 has a transition from 0 volts to +5 volts.

Decoded data bits are clocked one bit at a time thru serial to parallel converter 97 and stored in tri-state buffers 99 and 100. When 8 bits have been decoded counter 94 clocks flip-flop 98 through AND-gate 93 to signal receiving external data device (for brevity shown as 11 in FIG. 1) that an 8 bit data package is available. When both the READ and ½ DUPLEX signals from the data device to AND-gate 101 are logic 1, indicating that the device is ready to receive the data and that it must be presented in a ½ duplex mode, the AND gate is enabled. If a CHIP SELECT signal from the data device is also a logic 1 (to indicate that the data is desired from this particular circuit) the NAND-gate 104 produces a logic 0 output signal that enables the eight bits of data to be output from the tristate buffers 99 and 100.

This logic 0 output signal also disables the AND-gates 102 and 96 so that further incoming signals are not processed by the circuit until the reading operation is complete.

Decoding of the outputs of receiver 21 is done by taking the output of the positive level detector from receiver 21 and sampling the level at two points during the bit cell time. The output of the positive level detector from 21 is sampled as data by flip-flops 105 and 106. The clock pulse (CP) input of counter 107 is clocked at twice the frequency of Sysclk as defined in FIG. 3. 107 provides 16 counts for the entire bit cell. The data input for 105 is clocked on the third count of counter 107 (i.e., during the early part of the first half of the bit cell), and the data input for 106 is clocked on the seventh and a half count of 107 (right before the transmitter's mid-cell transition occurs). The "Q" outputs of these two flip-flops are then logically anded at 109, whose output is then used as the "DSA" input for 97 to indicate whether a "0" or "1" bit was received. This step helps to reduce errors produced by random impulse noise. Data is clocked thru 97 on the eighth count of 107, which produces pulses at the CP input of demultiplexer, or converter 97.

As noted the clock pulse (CP) input of counter 107 is clocked at twice the frequency of sysclk as defined in FIG. 3. AND-gate 110 controls the input to "CP" so that this clock is available for eight data bits at a time even though the actual clock frequency runs continuously. The output of gate 110 is disabled by the inversion of the "Q3" output of counter 94 which is counting the inverted clock pulses for converter 97. The inversion is to delay the eighth count of counter 94 by half a count thereby insuring that the outputs of 97 have stabilized before the "Q3" output of 94 clocks thru 98 and signals the device in FIG. 1 that data is available.

FIG. 6 shows the "1" and "0" wave shapes employed herein. Of course, identical results are obtained when the wave shapes for "1" and "0" are reversed.

An advantage of the process of this invention is that it can be used on lines which have various other voltages impressed on it. These voltages can include AC voltages such as 20 Hz 105 v p/p ringing voltages and DC voltage such as −48 v or −72 v talk battery voltages. Voice signal and other transmitted information can be present on the lines as well, without interference such as by lines 18, 18A, 18B and 18C as shown in FIG. 1.

It can also accommodate switches such as switches 23 and 23A shown in FIG. 1 in the transmission lines so long as metallic continuity is maintained and, as already noted, can be used with 1 or 2 pairs of conductors.

It will also be appreciated that the 8 bit package transmission scheme set out in the system covered by FIGS. 2-5 is not a requirement to the successful employment of this invention and that other modes of transmission such as continuous full duplex or time compression multiplexing may be used with the present invention.

The foregoing description is intended to illustrate the invention but not to limit its scope which is instead defined by the following claims.

What is claimed is:

1. A process for sending a stream of digital data over a high impedance metallic pair transmission line under high loss conditions comprising the steps of
    a. converting the digital data into a stream of binary code, the first element of said code being characterized by having a bit cell voltage-time wave shape that begins at 0 volts, moves sharply to an initial voltage A different than zero, at mid cell traverses 0 volts to a second voltage B of similar magnitude but opposite sign to the initial voltage A and that returns to zero at the end of the bit cell, said wave shape being further characterized by a duty cycle of 80% or greater but such as to present a clear return to zero state at the start and end of the bit cell and the second element of said code being a mirror image of said first element, moving first to voltage B and second to voltage A.
    b. with a transmitter, applying said stream of binary code to one end of the transmission line;
    c. with a detector, detecting said stream of binary code at the other end of the transmission line; and
    d. reformatting the detected stream of binary code to digital data.

2. The process of claim 1 wherein said metallic pair transmission line comprises twisted metallic pair telephone line.

3. The process of claim 1 wherein said detecting of step c is effected by reading the voltage at a plurality of points in the first half of the bit cell and determining if the voltage at at least a predetermined fraction of said points is at a voltage related to voltage A or at a voltage related to voltage B.

4. The process of claim 1 wherein the transmission line has a an additional voltage impressed on it.

5. The process of claim 4 wherein the additional voltage is a dc voltage.

6. The process of claim 4 wherein the additional voltage is a ac voltage.

7. The process of claim 1 wherein the transmission line has other transmitted information impressed on it.

8. The process of claim 1 wherein the transmission line is a continuous metallic line that contains switches.

9. The process of claim 1 wherein data is transmitted in both directions over 1 metallic pair.

10. The process of claim 1 wherein said duty cycle is an about 85.5% duty cycle and said high loss conditions are 70 dB or greater loss conditions.

11. In a process for sending a stream of digital data over a high impedance metallic pair transmission line under high loss conditions comprising the steps of
    a. converting the digital data into a stream of binary code, the first element of said code being characterized by having a bit cell voltage-time wave shape that begins at 0 volts, moves sharply to an initial voltage A different than zero, at mid cell traverses 0 volts to a second voltage B of similar magnitude but opposite sign to the initial voltage A and that returns to zero at the end of the bit cell, and the second element of said code being a mirror image of said first element, moving first to voltage B and second to voltage A.
    b. with a transmitter, applying said stream of binary code to one end of the transmission line;
    c. with a detector, detecting said stream of binary code at the other end of the transmission line; and
    d. reformatting the detected stream of binary code to digital data; the improvement comprising employing as said wave shape a wave shape having a duty cycle of 80% or greater but such as to present a clear return to zero state at the start and end of the bit cell.

* * * * *